(12) United States Patent
Barker et al.

(10) Patent No.: US 11,022,299 B2
(45) Date of Patent: Jun. 1, 2021

(54) MULTI-CIRCULATION HEAT RECOVERY STEAM GENERATOR FOR ENHANCED OIL RECOVERY/STEAM ASSISTED GRAVITY DRAINAGE

(71) Applicant: Babcock & Wilcox Power Generation Group Canada, Ltd., Cambridge (CA)

(72) Inventors: Gary R Barker, Cambridge (CA); Dong Chen, Waterloo (CA); Jonathan D Fleming, Kitchener (CA); Colin Malcolm MacKenzie, Guelph (CA)

(73) Assignee: Babcock & Wilcox Canada Corp., Cambridge (CA)

( * ) Notice: Subject to any disclaimer, the term of this patent is extended or adjusted under 35 U.S.C. 154(b) by 621 days.

(21) Appl. No.: 15/347,209

(22) Filed: Nov. 9, 2016

(65) Prior Publication Data

US 2017/0130953 A1    May 11, 2017

Related U.S. Application Data

(60) Provisional application No. 62/253,104, filed on Nov. 9, 2015.

(51) Int. Cl.
| | |
|---|---|
| *F22B 1/18* | (2006.01) |
| *E21B 43/24* | (2006.01) |
| *F22B 9/10* | (2006.01) |
| *F22B 35/00* | (2006.01) |

(52) U.S. Cl.
CPC ........ *F22B 1/1815* (2013.01); *E21B 43/2406* (2013.01); *F22B 9/10* (2013.01); *F22B 35/007* (2013.01)

(58) Field of Classification Search
CPC ........ F22B 9/10; F22B 1/1815; F22B 35/007; E21B 43/2406
USPC ......................................................... 122/7 R
See application file for complete search history.

(56) References Cited

U.S. PATENT DOCUMENTS

| | | | | |
|---|---|---|---|---|
| 2005/0279715 | A1* | 12/2005 | Strong | B01D 17/0211 210/774 |
| 2007/0266962 | A1* | 11/2007 | Stone | F22B 13/04 122/7 R |
| 2013/0220238 | A1* | 8/2013 | Krowech | F22B 37/22 122/491 |
| 2014/0305645 | A1* | 10/2014 | Macadam | F22G 1/00 166/303 |

* cited by examiner

*Primary Examiner* — Kenneth J Hansen
*Assistant Examiner* — John E Bargero
(74) *Attorney, Agent, or Firm* — Michael J. Seymour

(57) ABSTRACT

A multi-circulation heat recovery steam generator (HRSG) for steam assisted gravity drainage (SAGD)/Enhanced Oil Recovery (EOR) processes comprises a steam drum internally partitioned to provide a clean side and a dirty side. The clean side downcomer pipe supplies water to one or more generating banks as part of a clean circuit located in a high heat flux zone of the boiler. Boiler water is fed from the clean side of the drum to the dirty side of the drum via natural head differential. Water is then fed through a corresponding downcomer to a dirty generating bank, which is located in a low heat flux zone of the boiler.

20 Claims, 15 Drawing Sheets

LOWER HEADER ELEVATION

FEEDWATER CHEMISTRY – LOW BLOWDOWN

| Parameter | Boiler Feedwater @ 1000-1500psig, 2.5% Blowdown | | | |
|---|---|---|---|---|
| | ASME Specs. For Drum Boilers | Standard Drum Boiler | TSSG Boiler | TSSG-MC Boiler |
| Dissolved $O^2$ ppm | <0.007 | <0.007 | <0.007 | <0.007 |
| Total Fe ppm | <0.01 | <0.01 | 0.01 | 0.01 |
| Total Cu ppm | <0.01 | <0.01 | 0.01 | 0.01 |
| Non-Volatile TOC's ppm | <0.02 | <0.02 | 0.51 | 1 |
| Total Hardness ppm as $CaCO^3$ | ND | ND | 0.05 | 0.2 |
| Silica, total ppm | 0.1 | 0.1 | 0.10 | 1 |
| Total Dissolved Solids ppm | 5 | 5 | 7.7 | 15 |
| Specific Conductance μS/cm | 7.5 | 7.5 | 11.8 | 23.1 |
| P Alkalinity ppm as $CaCO^3$ | | | 1.5 | 3 |
| pH @ 25°C | 8.8-9.6 | 8.8-9.6 | 8.8-9.6 | 8.8-9.6 |

FIG. 11

FEEDWATER CHEMISTRY – MODERATE BLOWDOWN

| Parameter | Boiler Feedwater @ 1000-1500psig, 5% Blowdown ||||
| --- | --- | --- | --- | --- |
| | ASME Specs. For Drum Boilers | Standard Drum Boiler | TSSG Boiler | TSSG-MC Boiler |
| Dissolved O2 | <0.007 | <0.007 | <0.007 | <0.007 |
| Total Fe | <0.01 | <0.01 | 0.01 | 0.01 |
| Total Cu | <0.01 | <0.01 | 0.01 | 0.01 |
| Non-Volatile TOC's | <0.02 | <0.02 | 1.00 | 2 |
| Total Hardness | ND | ND | 0.1 | 0.4 |
| Silica, total | 0.1* | 0.1* | 0.19 | 2 |
| Total Dissolved Solids | 5* | 5* | 15.0 | 29 |
| Specific Conductance | 7.5 | 7.5 | 23.1 | 45.1 |
| P Alkalinity | | | 3.0 | 5.9 |
| pH @ 25C | 8.8-9.6 | 8.8-9.6 | 8.8-9.6 | 8.8-9.6 |

FIG. 12

MULTI-CIRCULATION BOILER WATER CHEMISTRY

| Parameter | Boiler Feedwater @ 2.5% Blowdown | | | OTSG at 20% Blowdown |
|---|---|---|---|---|
| | ASME | TSSG Boiler | TSSG Multi Circulation Clean | TSSG Multi Circulation Dirty | |
| Dissolved O2 | | | 0.5 | 0.5 | In to Out |
| Total Fe | | | | | |
| Total Cu | | | | | |
| Non-Volatile TOC's | 8.2 | 21 | 2.1 | 41 | 300-1500 |
| Total Hardness | <=2 | 2.1 | 0.41 | 8.2 | |
| Silica, total | | 4 | 2.1 | 41 | 15-80 |
| Total Dissolved Solids | <=100 | 315 | 31 | 615 | 5600-28000 |
| pH @ 25C | 9-10.5 | 10-10.5 | 9-10 | 10-10.5 | |

FIG. 13

MULTI-CIRCULATION HEAT RECOVERY STEAM GENERATOR FOR ENHANCED OIL RECOVERY/STEAM ASSISTED GRAVITY DRAINAGE

BACKGROUND

The present disclosure relates in general, to the field of power generation, oil and gas recovery and boiler design. More particularly, the present disclosure is directed to a heat recovery steam generator (HRSG) having multi-circulation capabilities for Steam Assisted Gravity Drainage (SAGD). The HRSG can be used, for example, as a rapid startup boiler to quickly generate steam that can be used to drive a turbine and produce electricity very efficiently or produce steam for enhanced oil recovery (EOR) or SAGD.

A HRSG is an apparatus used to extract or recover heat energy from a hot gas stream, such as a hot exhaust gas stream from a gas turbine. The extracted energy is used to convert water into steam, which may be used for power generation or hydrocarbon recovery. HRSGs may also be referred to as waste heat recovery boilers or turbine exhaust gas boilers. HRSGs may be utilized in combined cycle power plants to enhance overall thermal efficiency.

HRSGs may be unfired (i.e., use only the sensible heat of the gas as supplied), or may include supplemental fuel firing to raise the gas temperature to reduce heat transfer surface requirements, increase steam production, control superheated steam temperature, or meet process steam temperature requirements.

HRSGs include one or more pluralities of heat transfer surfaces, e.g. heat exchanger tubes, which may be referred to as boiler banks. When hot gas passes between and around the tubes of a boiler bank, depending on whether water or steam is flowing through the boiler bank, the water is converted to steam or the steam is superheated.

HRSGs can be grouped in a number of ways such as by the direction of exhaust gas flow (i.e., vertical or horizontal) or by the number of pressure levels (i.e., single pressure or multi-pressure). In a vertical type HRSG, exhaust gas flows vertically over horizontal tubes. In a horizontal type HRSG, exhaust gas flows horizontally over vertical tubes.

In a single pressure HRSG, steam is generated at a single pressure level through a steam drum, whereas multi-pressure HRSGs employ two (double pressure), three (triple pressure), or more steam drums. A triple pressure HRSG consists of three sections, i.e., a HP (high pressure) section, an IP (intermediate pressure) section, and a LP (low pressure) section. A reheat section may also be used to increase efficiency. Each section generally has a steam drum and an evaporator section where water is converted to steam. This steam is then passed through a superheater to raise the temperature past the saturation point if required.

As mentioned, HRSGs may include one or more steam drums. Steam drums are large, cylindrical vessels designed to permit separation of saturated steam from a steam-water mixture exiting the boiling heat transfer surfaces. In a natural circulation HRSG, the steam drums are oriented horizontally. Saturated steam is discharged through one or more outlet nozzles for direct use such as for SAGD or EOR, heating, and/or power generation. Steam-free water is recirculated with the feedwater to the boiler bank(s) for further steam generation.

The steam drum typically uses centrifugal force generated through either tangential entry of the two-phase fluid into cyclones or through stationary propeller-type or torturous path devices. The centrifugal action literally "squeezes" the steam out of the steam-water mixture.

Improvements have been made to enhance recovery of heavy oils and bitumens beyond conventional thermal techniques. One such technique, for example, is Steam Assisted Gravity Drainage or SAGD, taught by U.S. Pat. No. 4,344,485 issued Aug. 17, 1982 to Butler. This method uses pairs of horizontal wells, one vertically above the other, that are connected by a vertical fracture. A steam chamber rises above the upper well and oil warmed by conduction drains along the outside wall of the chamber to the lower production well.

The recovery of bitumen and similar heavy oils is often accomplished using in-situ techniques such as Steam Assisted Gravity Drainage in which steam is injected via the horizontal wells into the oil bearing deposit (injection well). This heats the bitumen or oil, which flows by gravity to the other horizontal well lower in the deposit (production well) where the mixture of bitumen or oil and water is taken to the surface. After the water is separated from the bitumen or oil, it is returned to the process where, after treatment, it is returned to the boiler for re-injection into the well.

Re-use of the water resource is a key factor for both conservation and environmental regulations. Even after treatment, however, the boiler feedwater can still contain volatile and non-volatile organic components as well as high levels of silica. Tube failures can occur due to poor boiler feedwater quality. In addition, there are limitations in the steam quality produced and the costs of operation, such as high pumping power and cost of condensate handling to satisfy zero-liquid discharge requirements from SAGD plants. It would be desirable to provide systems that are less sensitive to feedwater quality and/or can operate at desired efficiencies with lower-quality feedwater.

BRIEF DESCRIPTION

The present disclosure relates, in various embodiments, to heat recovery steam generators that utilize multi-circulation technology for enhanced oil recovery (EOR) and steam assisted gravity drainage (SAGD) applications and can be applied to drum boilers in general.

Disclosed in some embodiments is a heat recovery steam generator (HRSG) with multi-circulation for steam assisted gravity drainage (SAGD) or enhanced oil recovery (EOR) that includes a boiler having a steam drum that is internally partitioned to have a clean side and a dirty side. The boiler also includes a plurality of downcomer pipes connected to the steam drum for discharging water from the steam drum, wherein at least one of the plurality of downcomer pipes is connected to the clean side partition and at least one of the plurality of downcomer pipes is connected to the dirty side partition. The boiler further includes an inlet coupled to an exhaust source. The HRSG further includes a high heat flux zone and a low heat flux zone, and a plurality of steam generator banks, wherein at least one of the plurality of steam generator banks is located in the high heat flux zone and coupled to the at least one of the plurality of downcomer pipes connected to the clean side partition and wherein at least one of the plurality of steam generator banks located in the low heat flux zone and is coupled to the at least one of the plurality of downcomer pipes connected to the dirty side partition. The boiler water is fed from the clean side partition of the drum to the dirty side partition of the drum via natural head differential.

According to another aspect of the subject disclosure, there is provided a boiler with multi-circulation for a heat recovery steam generator (HRSG) for EOR and steam assisted gravity drainage (SAGD). The boiler includes a steam drum internally partitioned to have a clean side and a dirty side, and a plurality of downcomer pipes connected to the steam drum for discharging water from the steam drum, wherein at least one of the plurality of downcomer pipes is connected to the clean side partition and at least one of the plurality of downcomer pipes is connected to the dirty side partition. The boiler further includes a furnace having a plurality of individually replaceable membrane wall modules, each module comprising at least one upper header, a membrane roof connected to and sloping downwardly away from the upper header, a membrane wall connected to and descending from the membrane roof, a membrane floor connected to and sloping downwardly from the membrane wall, and at least one lower header connected to the membrane floor, the roof, the wall and the floor together defining a fire box having an inlet end and an outlet end, and the furnace including a membrane front wall connected to the upper and lower headers and being at the inlet end of the fire box. The boiler further includes an inlet coupled to a hot exhaust gas source for heating the firebox, and a high heat flux zone designated by proximity to the furnace and a low heat flux zone adjacent to the high heat flux zone. In addition, the boiler includes a plurality of steam generator banks, wherein at least one of the plurality of steam generator banks is located in the high heat flux zone and coupled to the at least one of the plurality of downcomer pipes connected to the clean side partition and wherein at least one of the plurality of steam generator banks located in the low heat flux zone and is coupled to the at least one of the plurality of downcomer pipes connected to the dirty side partition.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 is a table illustrating low blowdown feedwater chemistry impacting operations of the HRSG for use in an SAGD process according to one embodiment.

FIG. 12 is a table illustrating moderate blowdown feedwater chemistry impacting operations of the HRSG for use in an SAGD process according to one embodiment.

FIG. 13 is a table illustrating boiler water chemistry in a multi-circulation boiler reflecting operations of the HRSG for use in an SAGD process according to one embodiment.

DETAILED DESCRIPTION

Figure 1:
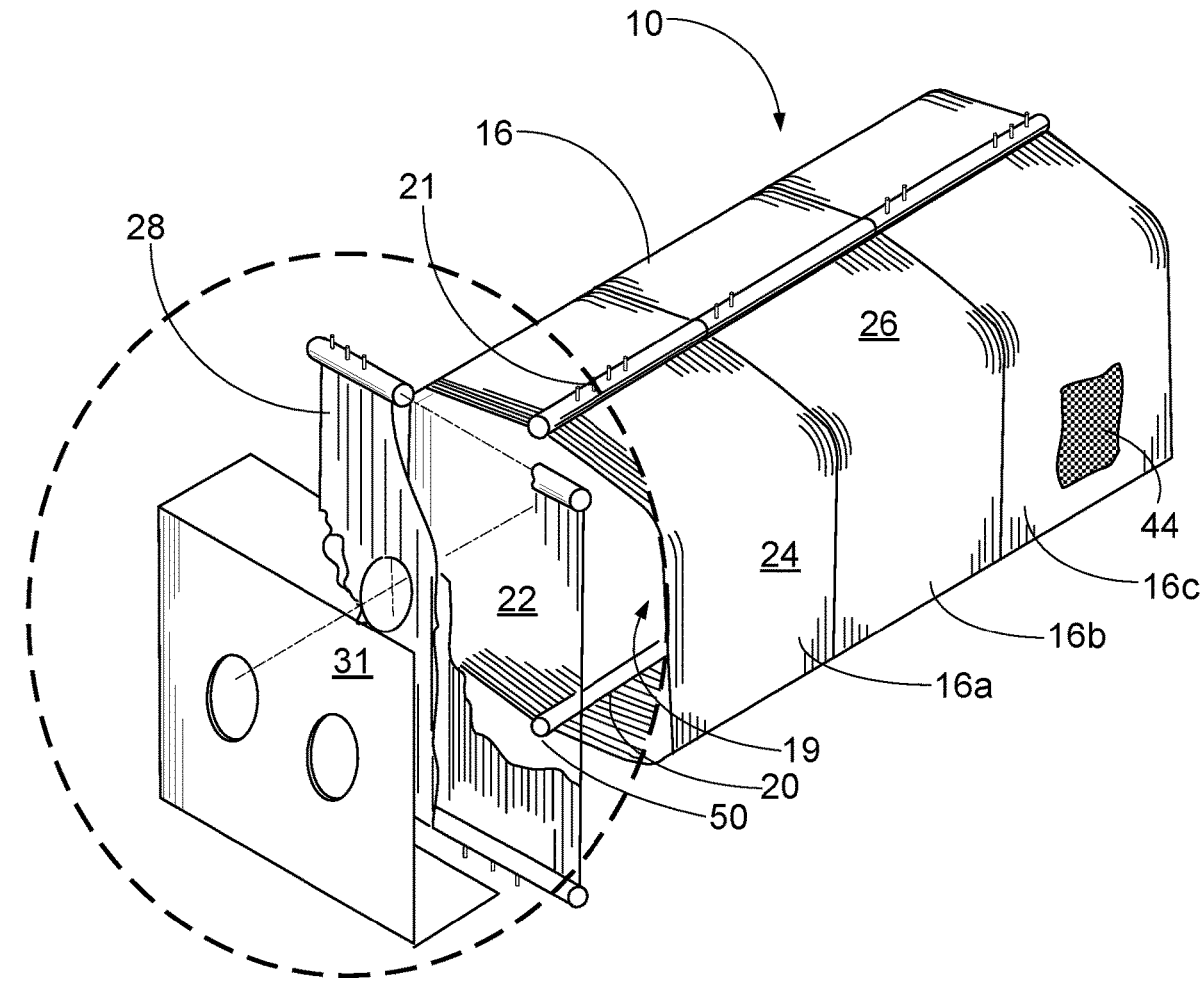
FIG. 1 is a perspective view of a boiler furnace/fire box for use in an SAGD process according to one embodiment of the subject disclosure.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

Some of the terms used herein are relative terms. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the fluids flow through an upstream component prior to flowing through a downstream component. It should be noted that in a loop, a first component can be described as being both upstream of and downstream of a second component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" and "downwards" are also relative to an absolute reference; upwards is always against the gravity of the earth.

A fluid at a temperature that is above its saturation temperature at a given pressure is considered to be "superheated." A superheated fluid can be cooled (i.e. transfer energy) without changing its phase. As used herein, the term "wet steam" refers to a saturated steam/water mixture (i.e., steam with less than 100% quality (% steam by mass) where quality is percent steam content by mass). As used herein, the term "dry steam" refers to saturated steam having a quality equal to 100% (i.e., no liquid water is present) or superheated steam.

To the extent that explanations of certain terminology or principles of the boiler and/or steam generator arts may be necessary to understand the present disclosure, the reader is referred to *Steam/its generation and use*, 42nd Edition, edited by G. L. Tomei, Copyright 2015, The Babcock & Wilcox Company, ISBN 978-0-9634570-2-8, the text of which is hereby incorporated by reference as though fully set forth herein.

As is known to those skilled in the art, heat transfer surfaces which convey steam-water mixtures are commonly referred to as evaporative boiler surfaces; heat transfer surfaces which convey steam therethrough are commonly referred to as superheating (or reheating, depending upon the associated steam turbine configuration) surfaces. Regardless of the type of heating surface, the sizes of the tubes, their material, diameter, wall thickness, number, and arrangement are based upon temperature and pressure for service, according to applicable boiler design codes, such as the American Society of Mechanical Engineers (ASME) Boiler and Pressure Vessel Code, Section I, or equivalent other codes as required by law. ASME also identifies different standards of water quality based on the amount of various dissolved compounds and total dissolved solids (TDS) in the water.

As noted above, feedwater quality and boiler water quality are concerns, as the evaporation of steam results in contaminants in the boiler water becoming more concentrated. The concentrated contaminants can leave deposits in the various water pathways through the boiler, negatively impacting performance and degrading components. As a result of this concentration, the feedwater generally should be cleaner (i.e. lower permissible TDS) than the boiler water, so that boiler water quality limits can be maintained.

The contaminant concentration in the boiler water can be controlled by blowdown. The two vary inversely, such that the less blowdown, the greater the concentration of contaminants. Accordingly, mass balance must be achieved so that at steady state, the mass flow of contaminants entering with the feedwater equals the mass flow of contaminants leaving with the blowdown. In SAGD and similar EOR process operations, the recovered water, after filtration, still contains relatively substantial amounts of contaminants.

In the present disclosure, a heat recovery steam generator (HRSG) is modified to include multi-circulation technology for use in SAGD/EOR applications. The feedwater is separated into two separate circulation loops within the boiler, referred to herein as a "clean" loop and a "dirty" loop. Boiler water with the lowest concentration of dissolved solids circulates in the high heat flux zones of the boiler, while boiler water with the highest concentration of dissolved solids circulates in the low heat flux zone of the boiler. Deposition of contaminants in the low heat flux zone is less problematic due to the lower operating temperatures.

The use of the HRSG-type boiler in SAGD applications helps to reduce emissions, increase efficiency, and recovers useful energy from the gas turbine exhaust which is used to generate steam for EOR/SAGD processes. The multi-circulation steam drum HRSG-type SAGD boiler design allows for the reuse of heat from a gas turbine generator to generate steam for SAGD applications and may be particularly useful for processes utilizing produced water (from the oil recovery stream) as a source of boiler feedwater.

Referring now to the drawings, in which like reference numerals are used to refer to the same or similar elements, the drawings show a gravity fed, multi-circulation boiler 10 for an SAGD process using low quality feedwater for carbonaceous material recovery. Starting with FIG. 1, the boiler includes a furnace 16, which is a water-cooled membrane panel construction. An integrated configuration is used such that the floor 22, walls 24 and roof 26 of the furnace are a single water circuit. This reduces the circuit length to reduce chances of internal deposits. The furnace 16 is configured to avoid horizontal or sloped tubes with shallow angles. In addition, sloped tube lengths are kept to a minimum to avoid steam/water segregation inside the tube. The furnace 16 is coupled to an exhaust stream (not shown) at the inlet 19 to receive hot exhaust gasses into the boiler 20 from a gas turbine (not shown) or other generating means. Optionally, or in addition to the exhaust transiting the inlet 19, the furnace may include a front wall 28 that is a vertical panel of membrane construction and houses the burners (not shown) and windbox 31. The roof 26, the wall 24 and the floor 22, together define a firebox having an inlet end at the front wall 28, and an outlet end, burners being at the inlet end of the firebox for heating the firebox.

Here, the furnace is formed from furnace steam generation surfaces that are arranged in three modules 16a, 16b and 16c (though the number of modules can vary). Each module comprises an upper header 21, a membrane roof 26 connected to and sloping downwardly away from the upper header, a membrane wall 24 connected to and descending from the membrane roof by gently curved tubes (e.g. having a radius of curvature of less than about 3 feet), a membrane floor 22 connected to and sloping downwardly from the membrane wall (also by gently curved tubes having a radius of curvature of less than about 3 feet for example), and a lower header 20 connected to the membrane floor, the roof, the wall and the floor together defining a fire box having an inlet end and an outlet end. The preferred sloping of the roof and floor with respect to their respective header is about 2 to 30 degrees to the horizontal, or more preferably about 5 to 15 degrees or about 10 degrees in the illustrated embodiments. Each lower header 20 is provided with access to one or more drains, e.g. at 50, for draining and cleaning of the water circuit within the module. The exterior of the membrane wall of each module is desirably covered with insulation 44, e.g. about 3" to 6" minimum fiber board.

Figure 2A:
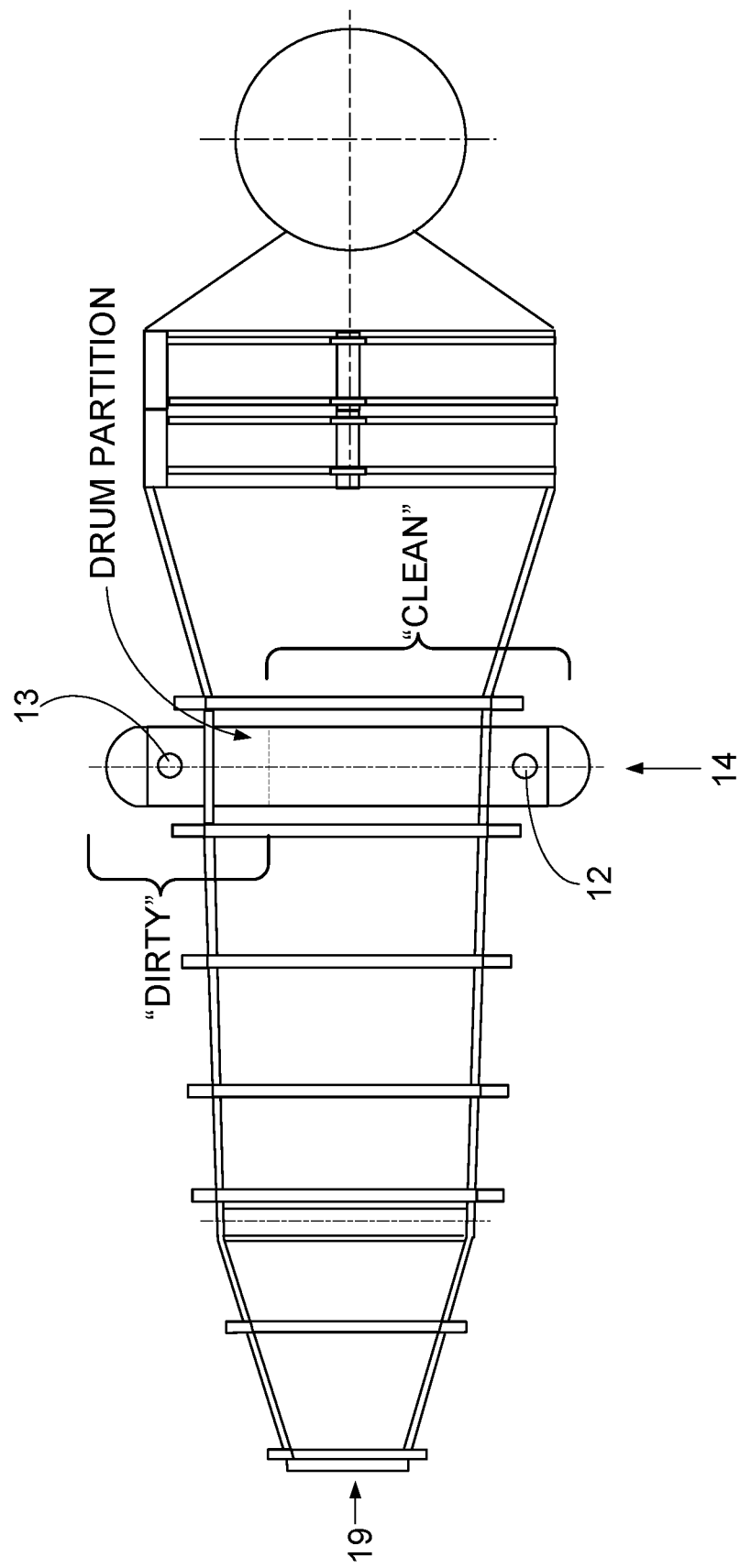
FIGS. 2A and 2B respectively illustrate side and top views of an embodiment of a heat recovery steam generator (HRSG) for use in an SAGD process according to one aspect of the subject disclosure.

FIG. 2A is a plan view of the HRSG boiler, and the steam drum 14 is visible. The inlet 19 from which hot exhaust gases enter the boiler is located at the left side of this figure. The steam drum 14 has an inside diameter of about 3 to about 9 feet. As indicated here, at least one "clean" downcomer pipe 12 for high quality boiler water is connected to one end of the steam drum. At least one "dirty" downcomer pipe 13 for low quality boiler water is also connected to the steam drum. (It should be noted that "low" and "high" quality boiler water are relative to each other, and not to ASME standards.) These downcomers are used to discharge water from the steam drum back into the boiler for receiving heat energy.

Figure 2B:
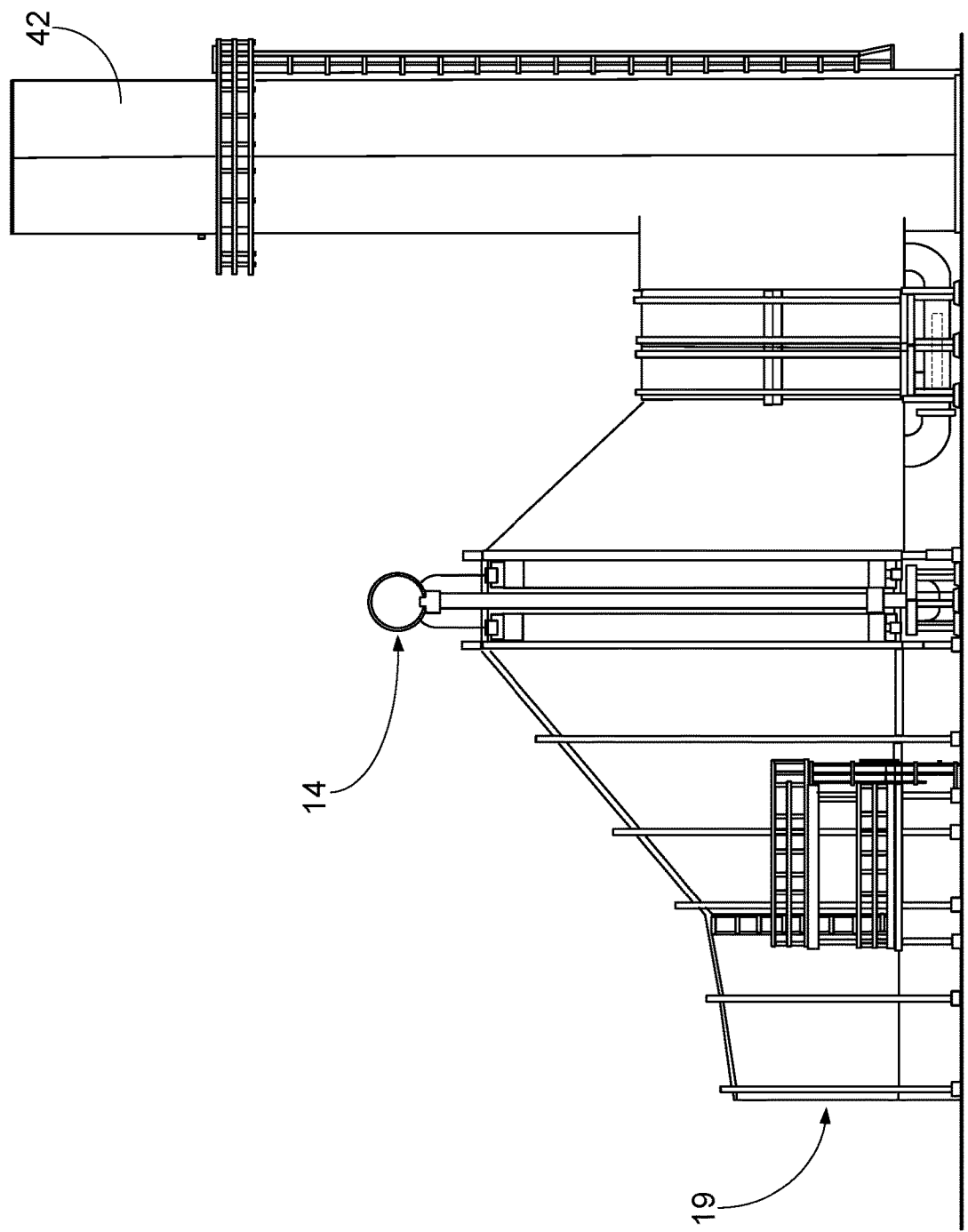

FIG. 2B is a side view of the HRSG boiler. Again, the inlet 19 is on the left side of the figure. The steam drum 14 is located above the furnace walls visible in FIG. 1. A stack 42 is located on the right side of the figure, and indicates where the exhaust gases, now depleted of heat energy, exit the boiler.

Figure 3A:
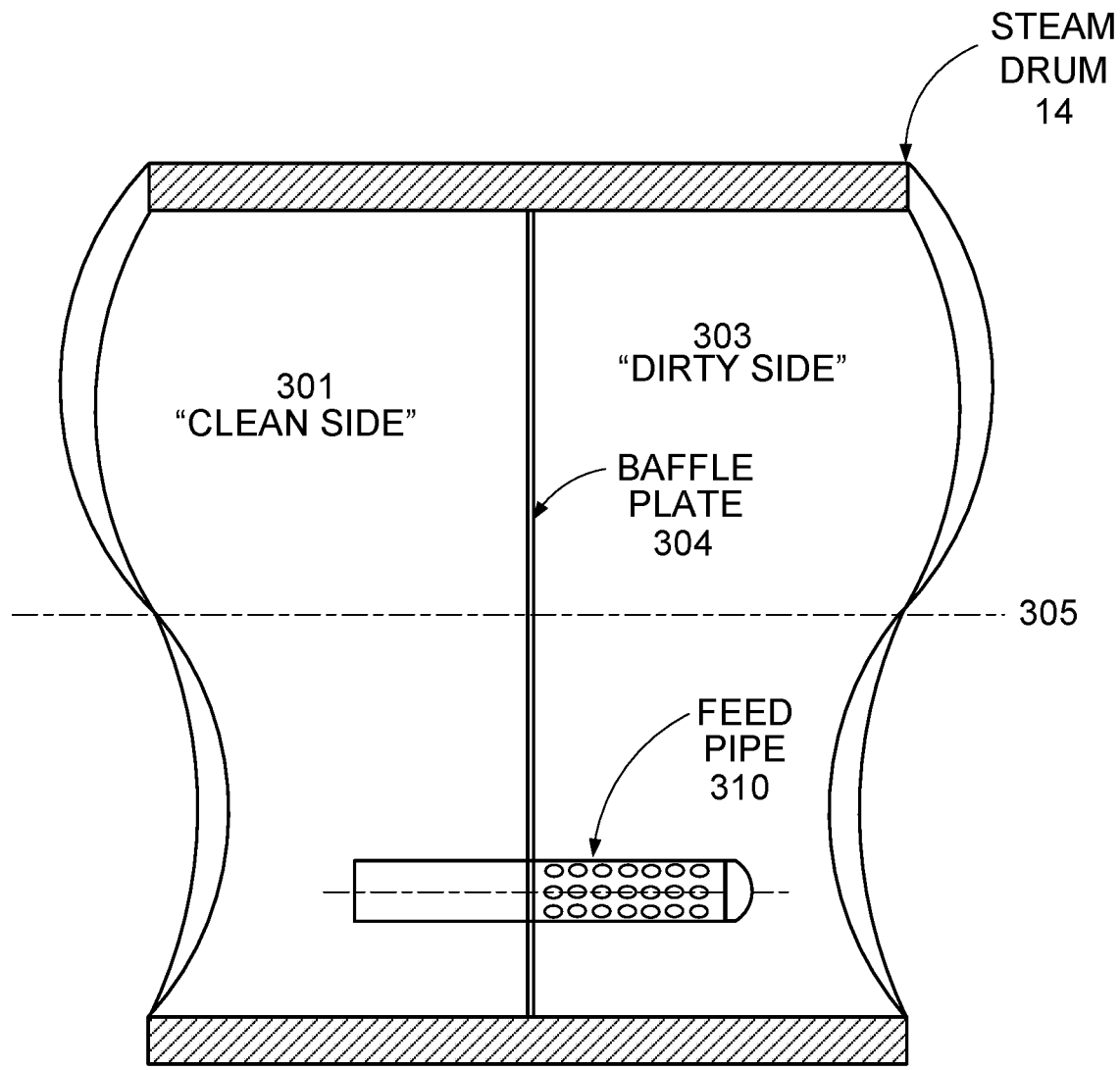
FIG. 3A is a side cross-sectional view of a steam drum used in the HRSGs of the present disclosure.

A side cross-sectional view of the steam drum 14 used in this HRSG is illustrated in FIG. 3A. The steam drum 14 is internally partitioned by a baffle, weir, internal distribution pipes, or the like, normal to the axis of the steam drum 14, providing a "clean side" 301 and a "dirty side" 303. The axis is indicated with reference number 305, and a baffle plate 304 is illustrated here. An interconnecting feed pipe 310 extends through the baffle plate 304 from the clean side 301 to the dirty side 303. The feed pipe should be located below the water level in the steam drum. A natural head differential is present between the clean side and the dirty side, so that water only flows from the clean side to the dirty side.

Figure 3B:
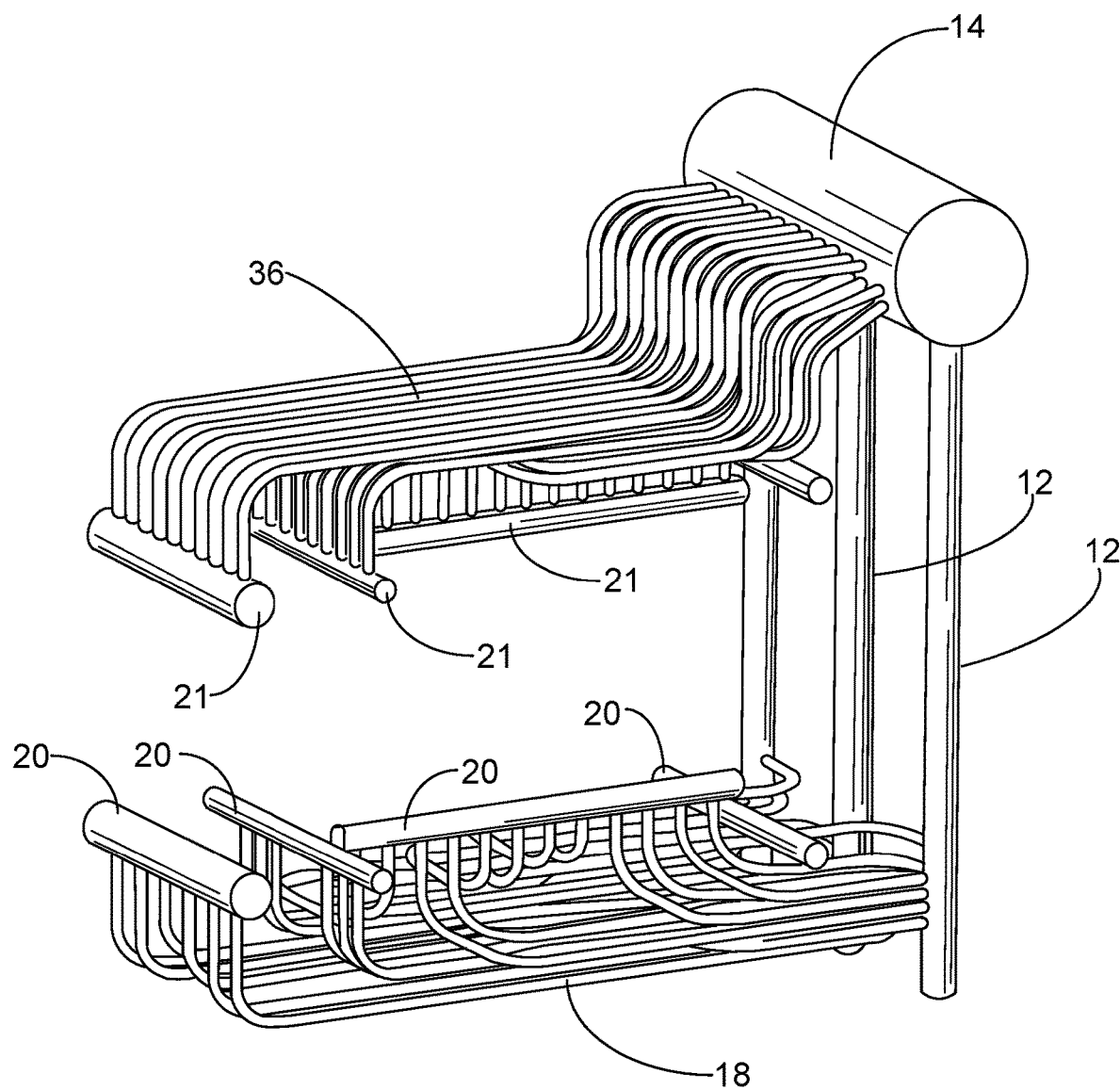
FIG. 3B is a perspective view of an arrangement of the feeders and risers for a steam drum of the boiler according to one aspect of the subject disclosure.

FIG. 3B is a perspective view of a given furnace module running "clean" boiler water. Boiler water flows down from steam drum 14 through downcomer pipes 12 through feeder lines 18 to lower headers 20. Tubes between lower headers 20 and upper headers 21 are not illustrated here for easier reference. In those tubes, the boiler water is exposed to the hot exhaust gas and absorb heat energy, becoming a steam/water mixture. Riser pipes 36 connect the upper headers 21 to the steam drum 14.

Figure 4:
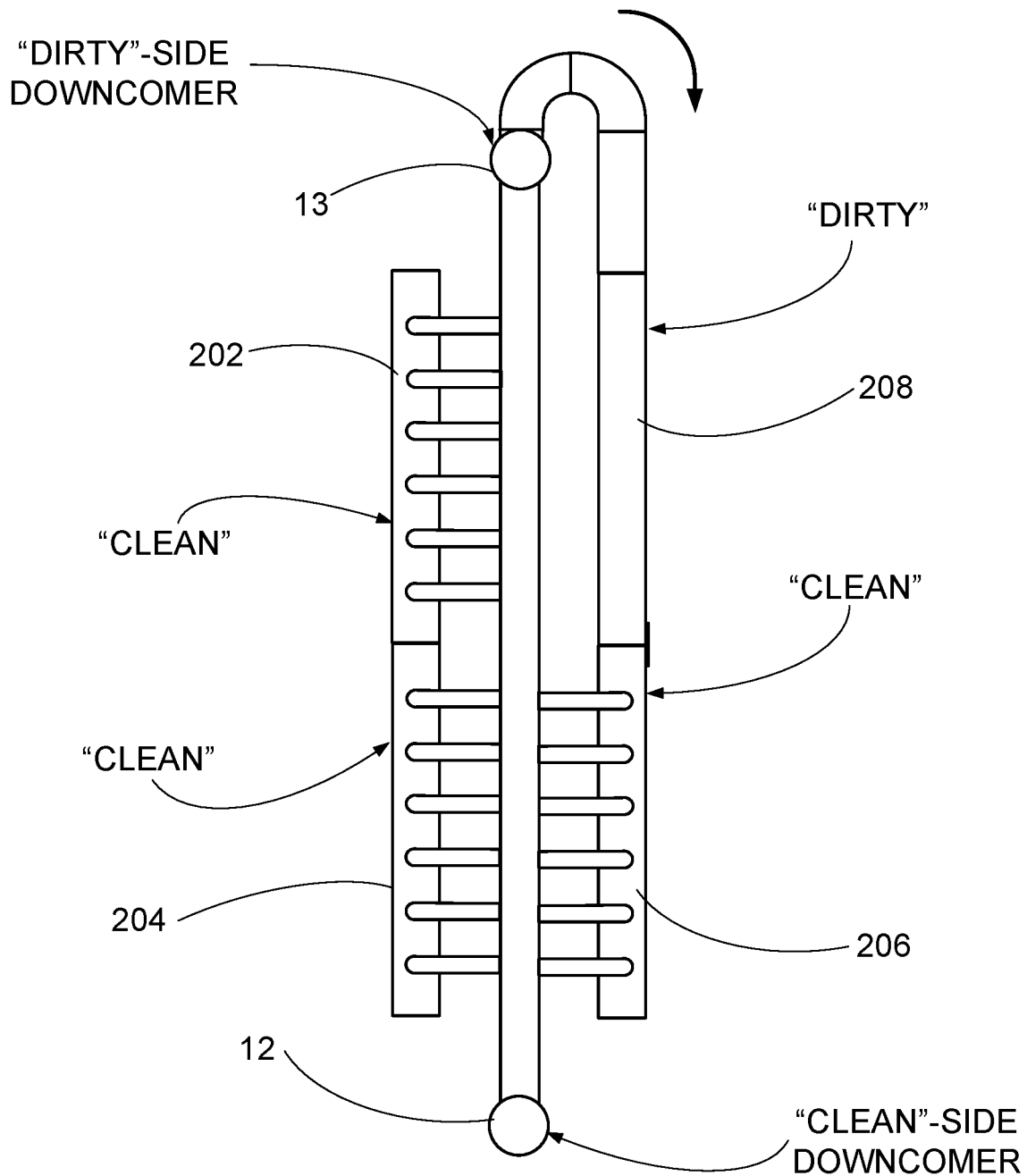
FIG. 4 is a plan view at the height of the lower headers of the clean steam generating banks and the dirty steam generating banks, illustrating their connection with the downcomer pipes.

FIG. 4 is a plan view at the height of the lower headers, illustrating their connection with the downcomer pipes The clean side downcomer pipe 12 supplies water to one or more steam generating banks as part of the "clean" circuits of the boiler 20. As shown, the steam drum 14 includes four steam generating bank sections, 202, 204, 206, and 208. Three of these four steam generating bank sections (202, 204, 206) are "clean" water sections. Boiler water is fed from the clean side of the drum to the dirty side of the drum by natural head differential created by the baffle, weir and/or internal distribution pipes (see FIG. 3A). Water on the "dirty" side of the steam drum is then fed through its corresponding downcomer 13 to the "dirty" water steam generating bank(s) 208. In the illustration of FIG. 4, the generating bank 208 is the fourth of the four banks (208) shown. The split of "dirty" and "clean" circuits and the number of generating banks, as will be appreciated, is determined based on circulation analysis considering the boiler heat absorption and steam generation requirements, as well as the actual quality of the boiler feedwater for the specific project.

The drum 14 is larger in diameter than typically provided for industrial boilers to accommodate possible foaming due to organic contaminants in the feedwater, for example a 6 foot inside diameter (ID) drum is used for the invention (or a steam drum in the range of 3 to 9 feet ID, or preferably 4 to 8 feet ID, or more preferably 5-7 feet ID).

Figure 5:
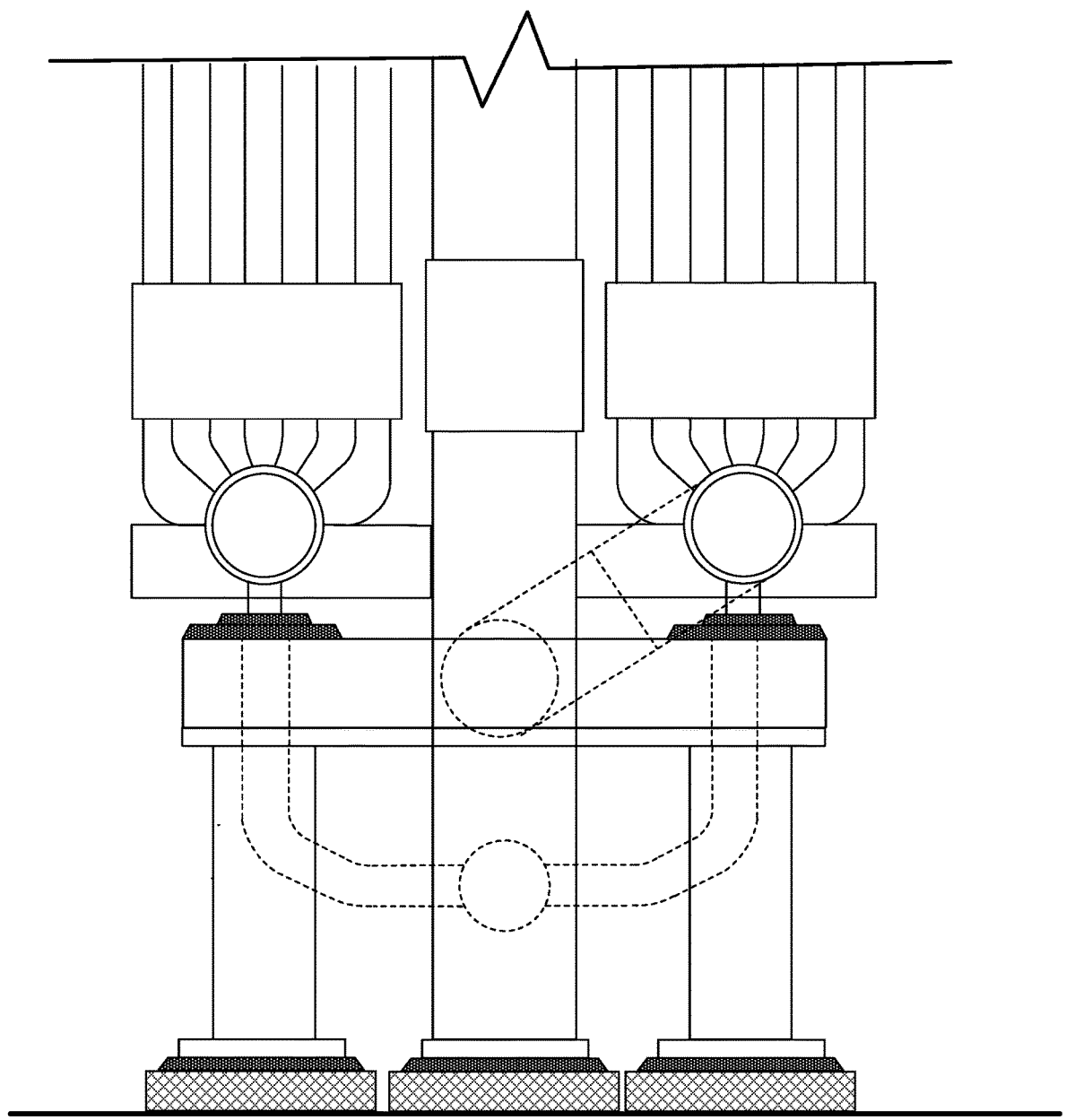
FIG. 5 illustrates a side view of the lower header elevation of the HRSG according to one aspect of the subject disclosure.

FIG. 5 provides a close-up view of the lower header and feeder pipes of the boiler 20.

Figure 6:
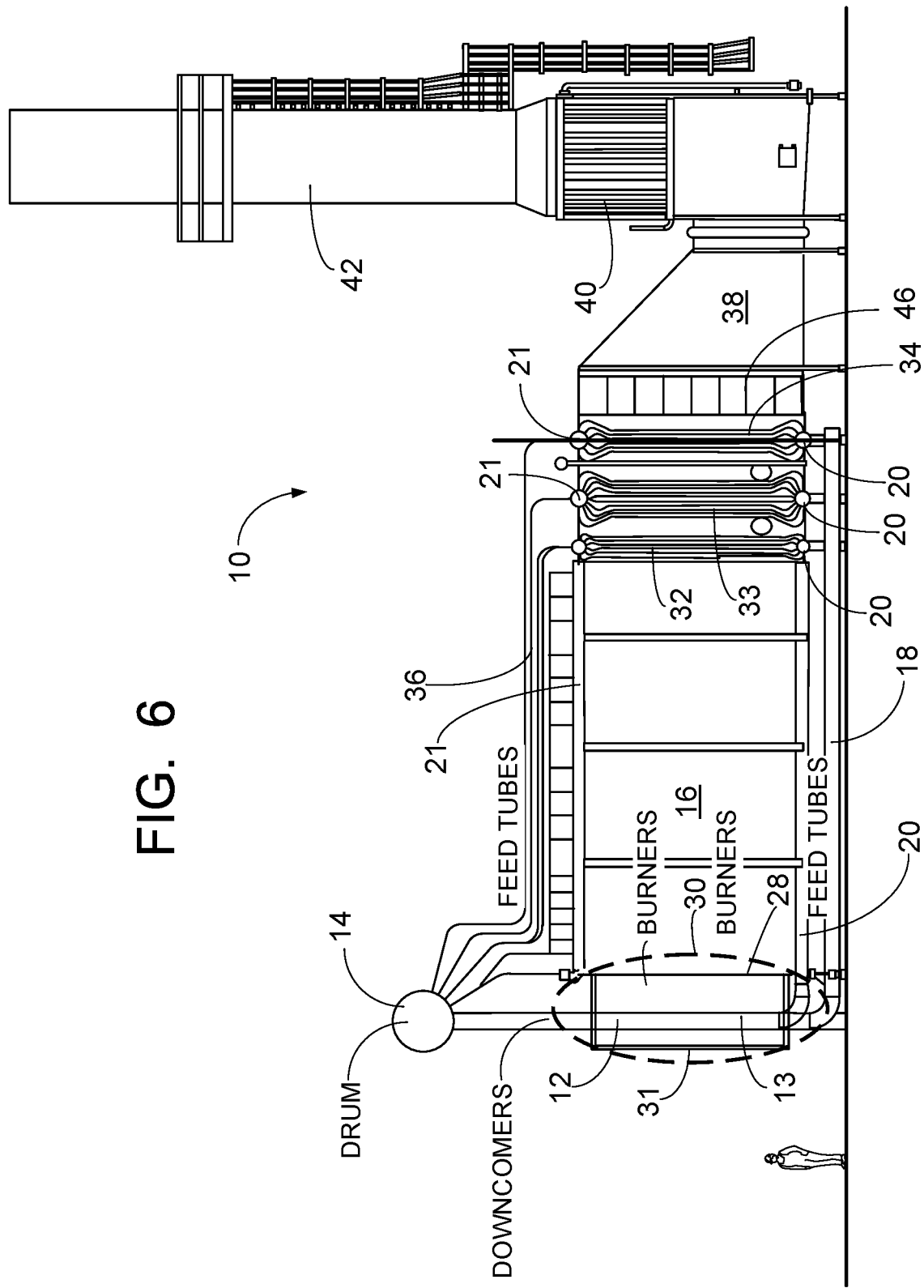
FIG. 6 is a side elevational view of the boiler adapted for EOR/SAGD processing in accordance with one aspect of the subject disclosure.
Figure 7:
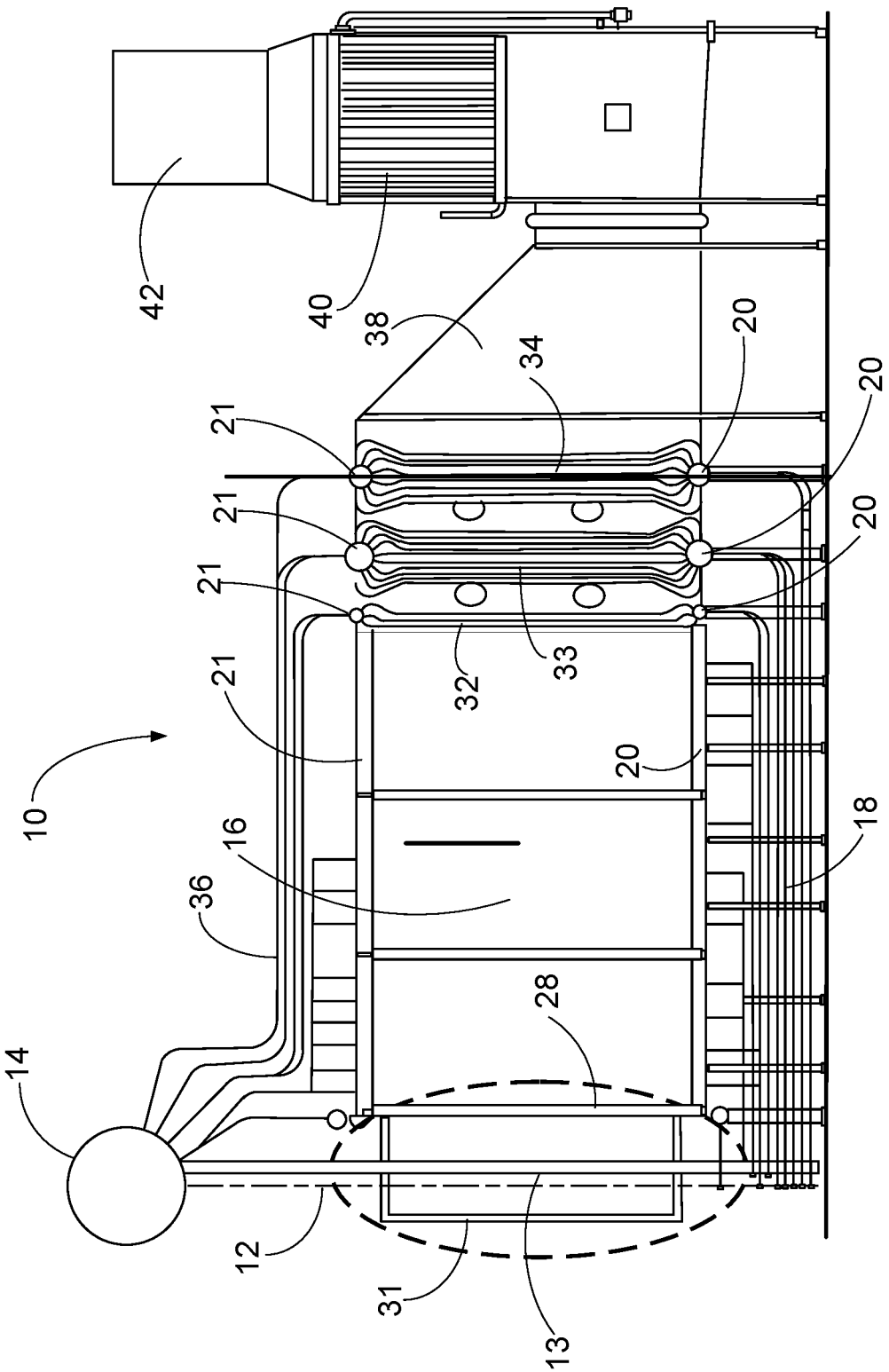
FIG. 7 is a view similar to FIG. 6 of another embodiment of the boiler adapted for SAGD processing in accordance with one aspect of the subject disclosure.
Figure 8:
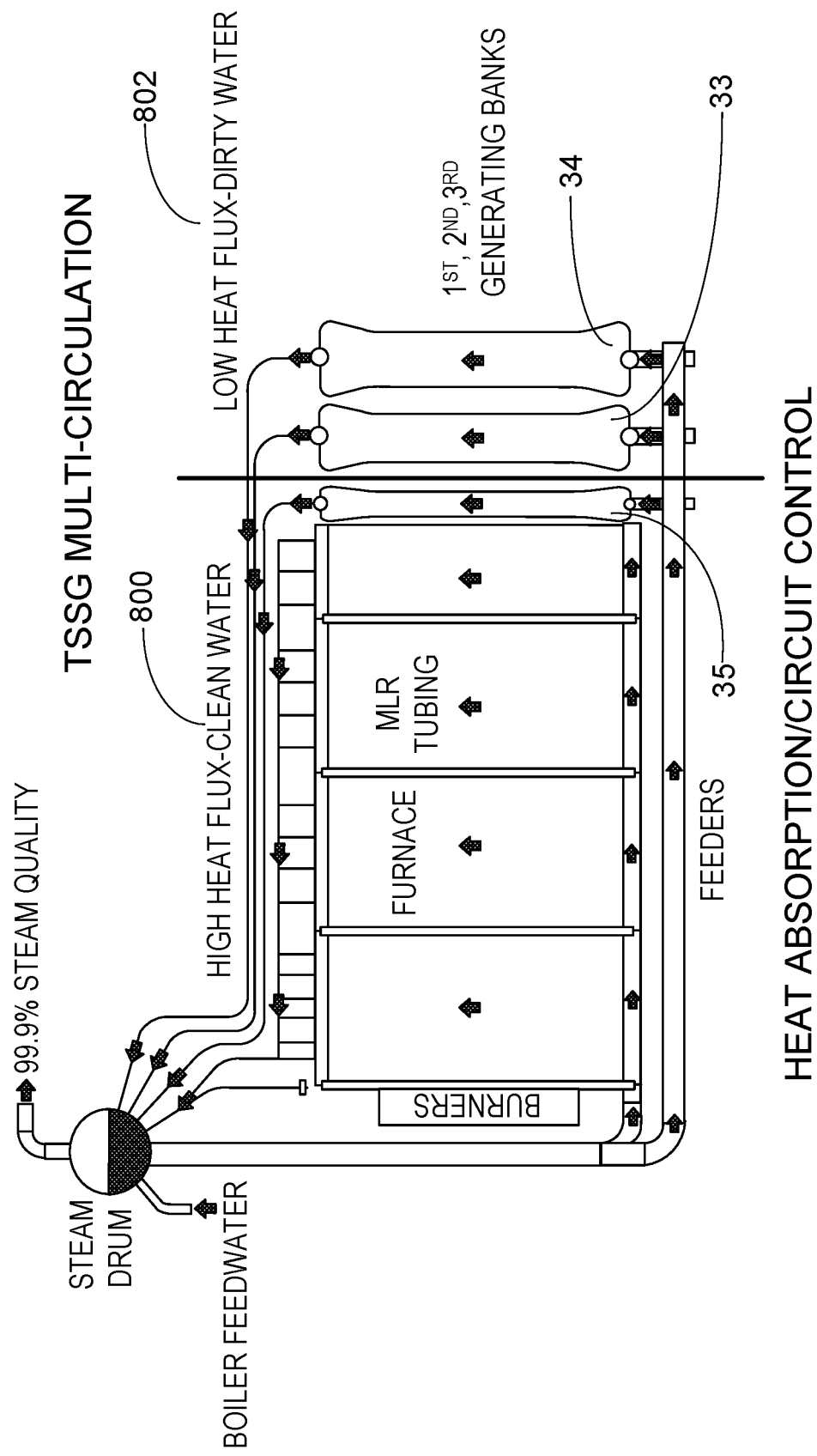
FIG. 8 is a simplified side view of the heat absorption and flow of the multi-circulation operations of the Boiler and HRSG of the figures depicted herein.

FIGS. 6-8 are side views of different embodiments showing various aspects of the present disclosure. Referring first to FIG. 6 and FIG. 7, from drum 14, downcomer pipes 12, 13 feed water to the boiler via feeder tubes 18 connecting the downcomers 12 and lower headers 20. The furnace 16 is a water-cooled membrane panel construction. The furnace front wall 28 is a vertical panel of membrane construction and houses the burners 30 and windbox 31. The furnace 16 is upstream of the rear wall screen 32 and generating banks 33, 34. Each bank is modularized for transportation and ease of replacement. The screen bank and the first generating bank include wall and roof tubes that form the gas boundary. The steam generation components (furnace and convective surface) are interconnected to the steam drum 14 via risers or riser pipes 36 between the upper headers 21 and the steam drum. This completes the circulation loop. From the convective surface, the gas travels through a transition flue 38 to an economizer 40 and stack arrangement 42 as in standard industrial boiler.

In FIG. 6, the boiler includes a selective catalytic reduction or SCR module 46 downstream of the generating banks 33, 34 and the stack 42. The transition flue 38 is of reducing cross-sectional area between the firebox outlet and the stack.

As seen in FIG. 8, the low heat flux zone 802 that receives "dirty" water is downstream of the high heat flux zone 800 that receives "clean" water. The high heat flux zone is closer to the inlet for the heated gas, illustrated here by the burner.

It will be appreciated that the use of multi-circulation technology will significantly reduce the potential for formation of internal tube deposits and fouling of HRSG tubes and other pressure parts with the use of sub-ASME boiler feedwater associated with the use of mechanical vapor compression water treatment commonly used to treat produced water for use as boiler feedwater in SAGD/EOR facilities. It will further be appreciated that the disclosed embodiments allow for the widespread use of HRSG in SAGD applications in enhanced oil recovery and SAGD projects worldwide.

The boiler of the present disclosure is a multi-circulation HRSG boiler that is capable of operating with sub-ASME feedwater quality available from an oil or bitumen recovery SAGD process in the oil sands of Alberta, for example, and, again for example, a 75,000 to 1,000,000 lb/hr unit. The present embodiments disclosed in the accompanying figures and described herein are meant to satisfy the market need for such a boiler.

Figure 9:
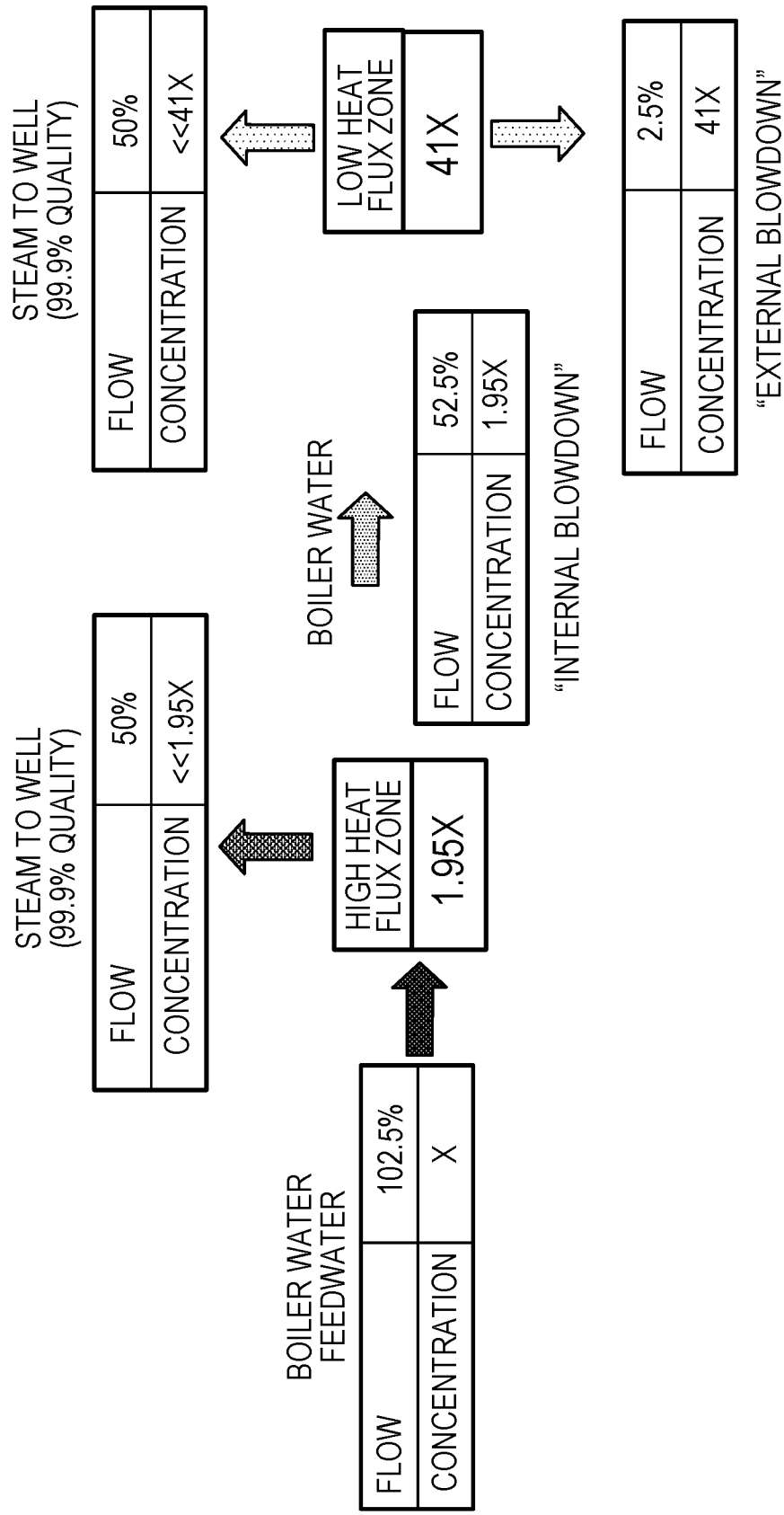
FIG. 9 illustrates a multi-circulation schematic of the HRSG of FIGS. 1-2B.
Figure 10:
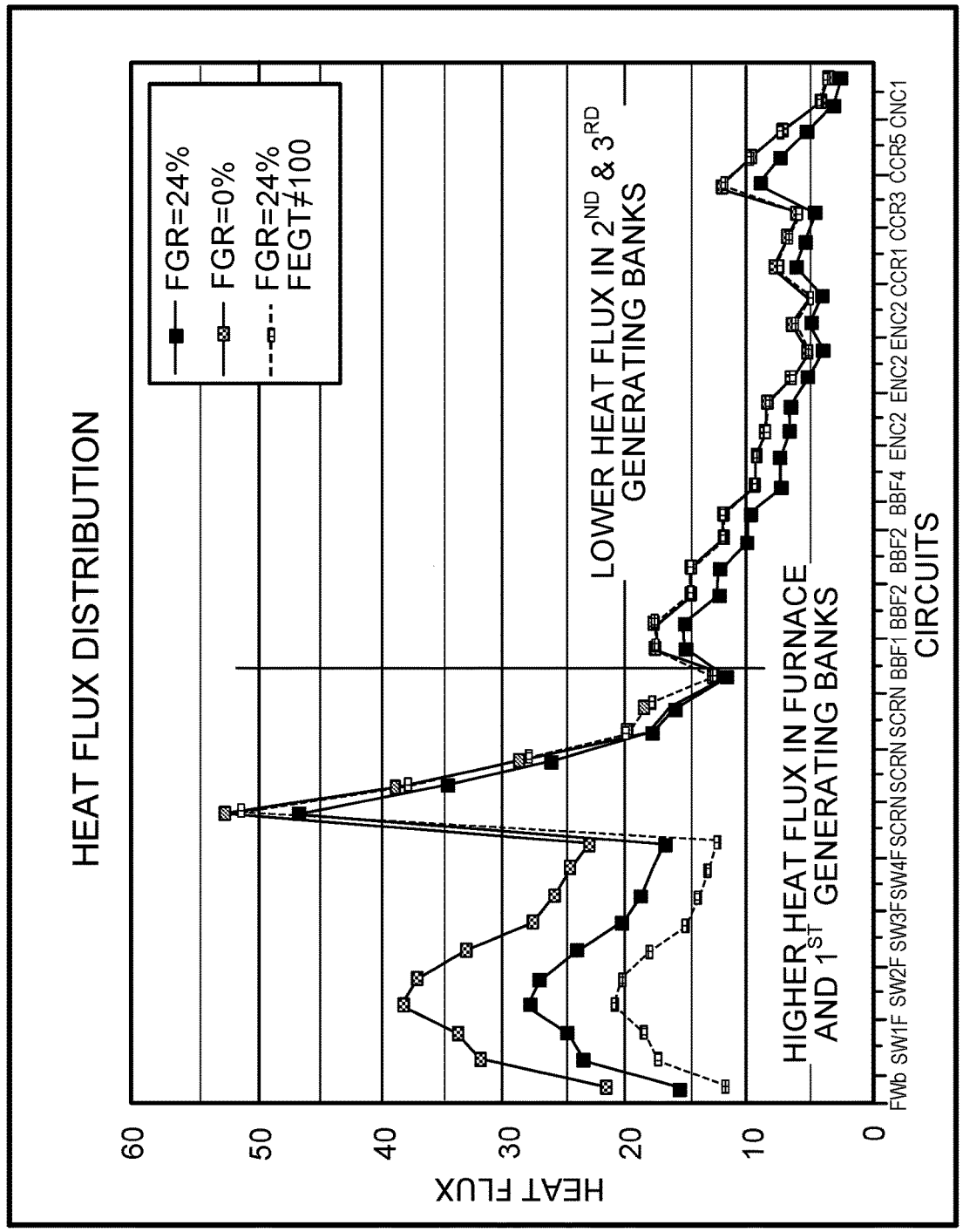
FIG. 10 is a graph illustrating heat flux distribution of the HRSG of FIGS. 1A-1B.

Multi-circulation of this recovered water, i.e., the "dirty water" is accomplished utilizing the HRSG design of the subject disclosure. FIG. 9 provides an illustration of a multi-circulation schematic depicting the varying contaminant levels of respective feedwater to the high-heat flux zone 800 and the low-heat flux zone 802 of the boiler 20. FIG. 10 provides a graphical illustration of the heat flux difference between the zones 800 and 802 of the embodiment disclosed in FIG. 8. FIGS. 11-13 provide further illustrations of the feedwater chemistry impacting operations of the HRSG-type multi-circulation SAGD process of the subject disclosure. As seen in these figures, the "TSSG-MC" boiler of the present disclosure can tolerate much higher levels of solids compared to standard boilers and ASME specifications.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A heat recovery steam generator (HRSG) boiler with multi-circulation for steam assisted gravity drainage (SAGD) or enhanced oil recovery (EOR), comprising:

an inlet coupled to an exhaust source;
a steam drum internally partitioned to have a clean side and a dirty side,
a clean downcomer pipe connected to the clean side of the steam drum;
a clean riser pipe connected to the clean side of the stream drum;
a dirty downcomer pipe connected to the dirty side of the steam drum;
a dirty riser pipe connected to the dirty side of the steam drum;
a clean steam generator bank located in a high heat flux zone and coupled to the clean downcomer pipe and the clean riser pipe; and
a dirty steam generator bank located in a low heat flux zone and coupled to the dirty downcomer pipe and the dirty riser pipe;
wherein boiler water is fed from the clean side of the drum to the dirty side of the steam drum via natural head differential.

2. The boiler of claim 1, wherein boiler water is fed from the clean side to the dirty side of the drum via natural head differential created by a baffle or weir.

3. The boiler of claim 1, wherein boiler water is fed from the clean side to the dirty side of the drum via natural head differential created by an internal distribution configuration of pipes within the drum.

4. The boiler of claim 1, wherein the exhaust source is a gas turbine generator.

5. The boiler of claim 1, wherein an internal partition of the steam drum is normal to an axis of the steam drum.

6. The boiler of claim 1, further comprising an economizer, wherein the clean side is fed by feedwater from the economizer.

7. The boiler of claim 1, further comprising:
a furnace having a plurality of individually replaceable membrane wall modules, each module comprising at least one upper header, a membrane roof connected to and sloping downwardly away from the upper header, a membrane wall connected to and descending from the membrane roof, a membrane floor connected to and sloping downwardly from the membrane wall, and at least one lower header connected to the membrane floor, the roof, the wall and the floor together defining a fire box having an inlet end and an outlet end, and the furnace including a membrane front wall connected to the upper and lower headers and being at the inlet end of the fire box.

8. The boiler of claim 7, wherein the inlet coupled to the hot exhaust gas is coupled to the firebox inlet providing heat thereto.

9. A boiler with multi-circulation for a heat recovery steam generator (HRSG) for steam assisted gravity drainage (SAGD) or enhanced oil recovery (EOR), comprising:
a steam drum internally partitioned to have a clean side and a dirty side;
a clean downcomer pipe connected to the clean side of the steam drum;
a clean riser pipe connected to the clean side of the steam drum;
a dirty downcomer pipe connected to the dirty side of the steam drum;
a dirty riser pipe connected to the dirty side of the steam drum;
a furnace having a plurality of individually replaceable membrane wall modules, each module comprising at least one upper header, a membrane roof connected to and sloping downwardly away from the upper header, a membrane wall connected to and descending from the membrane roof, a membrane floor connected to and sloping downwardly from the membrane wall, and at least one lower header connected to the membrane floor, the roof, the wall and the floor together defining a fire box having an inlet end and an outlet end, and the furnace including a membrane front wall connected to the upper and lower headers and being at the inlet end of the fire box;
an inlet coupled to a hot exhaust gas source for heating the firebox;
a clean steam generator bank located in a high heat flux zone and coupled to the clean downcomer pipe and the clean riser pipe; and
a dirty steam generator bank located in a low heat flux zone and coupled to the dirty downcomer pipe and the dirty riser pipe.

10. The boiler of claim 9, further comprising an economizer, wherein the clean side is fed by feedwater from the economizer.

11. The boiler of claim 9, further comprising a stack connected to the firebox outlet downstream of the clean and dirty steam generator banks.

12. The boiler of claim 9, wherein boiler water is fed from the clean side of the drum to the dirty side of the drum via natural head differential.

13. The boiler of claim 12, wherein boiler water is fed from the clean side to the dirty side of the drum via natural head differential created by a baffle or weir.

14. The boiler of claim 12, wherein boiler water is fed from the clean side to the dirty side of the drum via natural head differential created by an internal distribution configuration of pipes within the drum.

15. A heat recovery steam generator (HRSG) boiler with multi-circulation for steam assisted gravity drainage (SAGD) or enhanced oil recovery (EOR), comprising:
an inlet coupled to an exhaust source;
a steam drum having an internal partition that provides a clean side and a dirty side, wherein an interconnecting feed pipe extends through the internal partition from the clean side to the dirty side;
a clean downcomer pipe connected to the clean side of the steam drum;
a clean riser pipe connected to the clean side of the steam drum;
a dirty downcomer pipe connected to the dirty side of the steam drum;
a dirty riser pipe connected to the dirty side of the steam drum;
a clean steam generator bank located in a high heat flux zone and coupled to the clean downcomer pipe and the clean riser pipe; and
a dirty steam generator bank located in a low heat flux zone and coupled to the dirty downcomer pipe and the dirty riser pipe.

16. The boiler of claim 15, wherein the internal partition of the steam drum is normal to an axis of the steam drum.

17. The boiler of claim 15, wherein the internal partition of the steam drum is formed by a baffle plate, a weir, or internal distribution pipes.

18. The boiler of claim 15, further comprising an economizer, wherein the clean side is fed by feedwater from the economizer.

19. The boiler of claim 15, further comprising:
a furnace having a plurality of individually replaceable membrane wall modules, each module comprising at least one upper header, a membrane roof connected to and sloping downwardly away from the upper header, a membrane wall connected to and descending from the membrane roof, a membrane floor connected to and sloping downwardly from the membrane wall, and at least one lower header connected to the membrane floor, the roof, the wall and the floor together defining a fire box having an inlet end and an outlet end, and the furnace including a membrane front wall connected to the upper and lower headers and being at the inlet end of the fire box.

20. The boiler of claim 19, wherein the inlet coupled to the hot exhaust gas is coupled to the firebox inlet providing heat thereto.

\* \* \* \* \*